United States Patent
Scheffer et al.

(10) Patent No.: US 6,252,317 B1
(45) Date of Patent: Jun. 26, 2001

(54) ELECTRIC MOTOR WITH RING ROTOR PASSING THROUGH COILS

(76) Inventors: Edward N. Scheffer, 15509 18th Ave., W., Lynnwood, WA (US) 98307; Jerry W. Scheffer, 29410 118th Ave., SE., Auburn, WA (US) 98092

( * ) Notice: Subject to any disclaimer, the term of this patent is extended or adjusted under 35 U.S.C. 154(b) by 0 days.

(21) Appl. No.: 09/347,875

(22) Filed: Jul. 6, 1999

Related U.S. Application Data

(63) Continuation-in-part of application No. 09/034,871, filed on Mar. 4, 1998, now abandoned.

(51) Int. Cl.[7] .............................. H02K 27/00; H02K 7/06; H02K 7/10; H02K 1/22
(52) U.S. Cl. ................................ 310/46; 310/83; 310/99; 310/267
(58) Field of Search .................................. 310/46, 83, 99, 310/90, 90.5, 156, 254, 261, 267, 164, 179, 14

(56) References Cited

U.S. PATENT DOCUMENTS

| | | | |
|---|---|---|---|
| 219,393 | 9/1879 | Edison | 310/184 |
| 3,168,665 * | 2/1965 | Holper | 310/114 |
| 3,585,425 | 6/1971 | Newell | 310/49 R |
| 3,665,227 | 5/1972 | Busch | 310/46 |
| 3,679,277 * | 7/1972 | Dohmen | 308/187 |
| 3,809,933 | 5/1974 | Sugawara et al. | 310/52 |
| 4,025,807 * | 5/1977 | Clover et al. | 310/46 |
| 4,169,983 * | 10/1979 | Felder | 310/46 |
| 4,214,178 * | 7/1980 | Tippner | 310/14 |
| 4,291,248 * | 9/1981 | Rainbolt | 310/14 |
| 4,305,024 * | 12/1981 | Kuroki | 318/254 |
| 5,177,387 | 1/1993 | McMichael | 310/90.5 |
| 5,317,228 | 5/1994 | Leupold | 310/178 |
| 5,581,135 * | 12/1996 | Ito et al. | 310/52 |
| 5,610,457 | 3/1997 | Kurita | 310/68 B |
| 5,753,986 * | 5/1998 | Ohtani | 310/56 |
| 5,798,591 * | 8/1998 | Lillington et al. | 310/164 |
| 5,831,364 | 11/1998 | Buse | 310/156 |

\* cited by examiner

*Primary Examiner*—Nestor Ramirez
*Assistant Examiner*—Dang Dinh Le
(74) *Attorney, Agent, or Firm*—Coudert Brothers

(57) ABSTRACT

An electric motor includes a plurality of coils through which passes a ring rotor having a plurality of magnets supported thereon. The magnets are arranged about the ring rotor to be equidistant from an axis of rotation coinciding with the motor output shaft. The polarity of the magnets are alternated with North poles of adjacent magnets facing toward or against the direction of rotation of the rotor. The position of the rotor is detected and correspondingly electrical energy is applied to the coils to induce electro-magnetic fields which couple and superimpose with the magnetic fields of the permanent magnets. When the electrical energy is alternated between a certain voltage level and its inverse, each coil is able to simultaneously attract and repel adjacent magnets, thereby causing rotational movement of the rotor. The coils may be formed with superconducting materials and enclosed so that they may be cooled to superconducting temperatures. Other features to improve motor efficiency are shown.

66 Claims, 11 Drawing Sheets

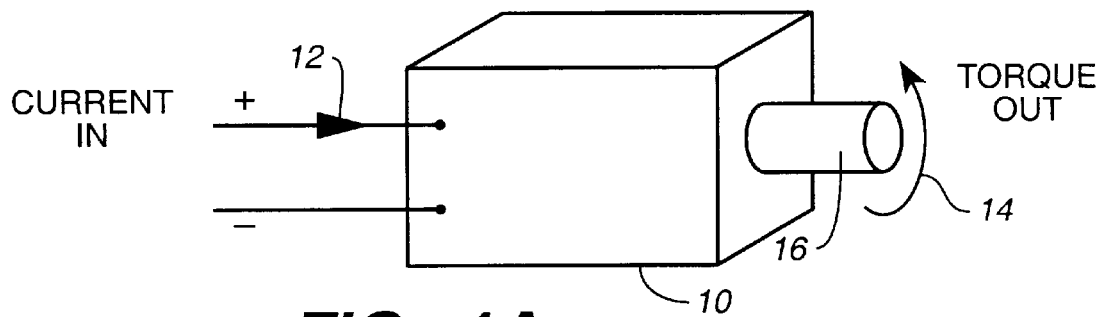
FIG._1A
*(PRIOR ART)*
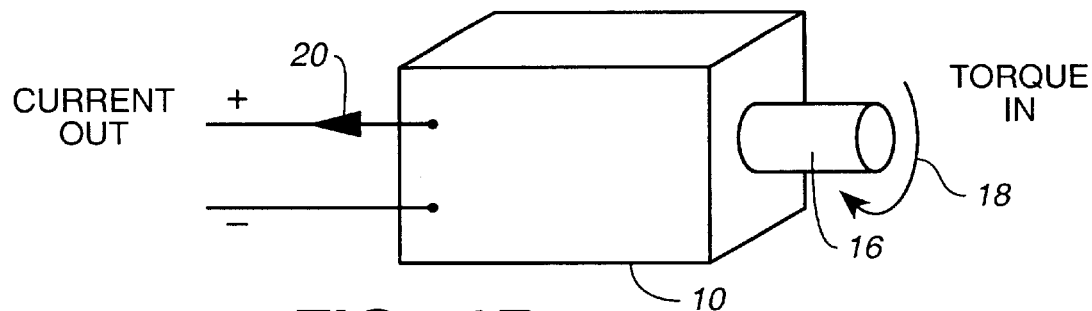
FIG._1B
*(PRIOR ART)*

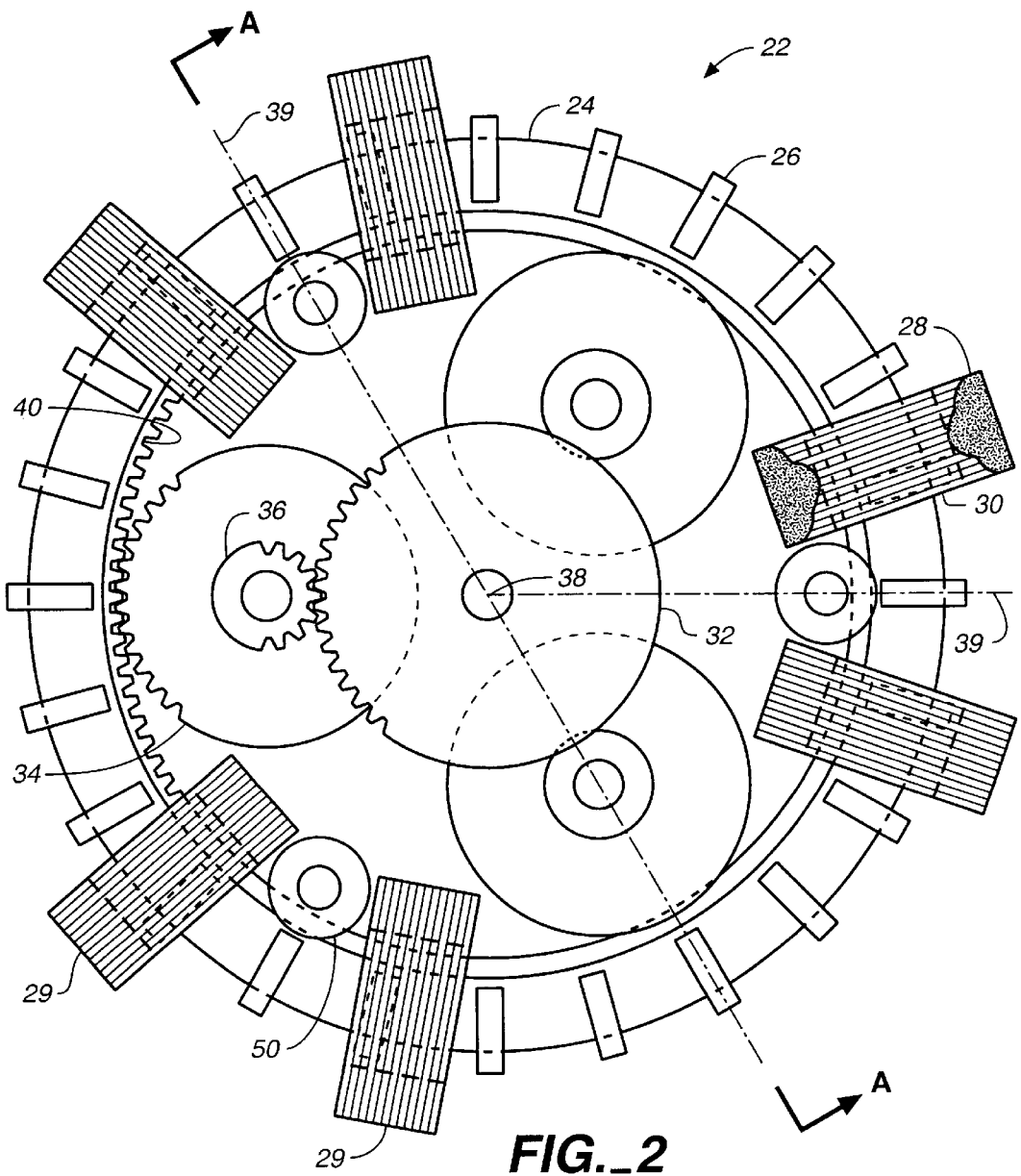
FIG._2

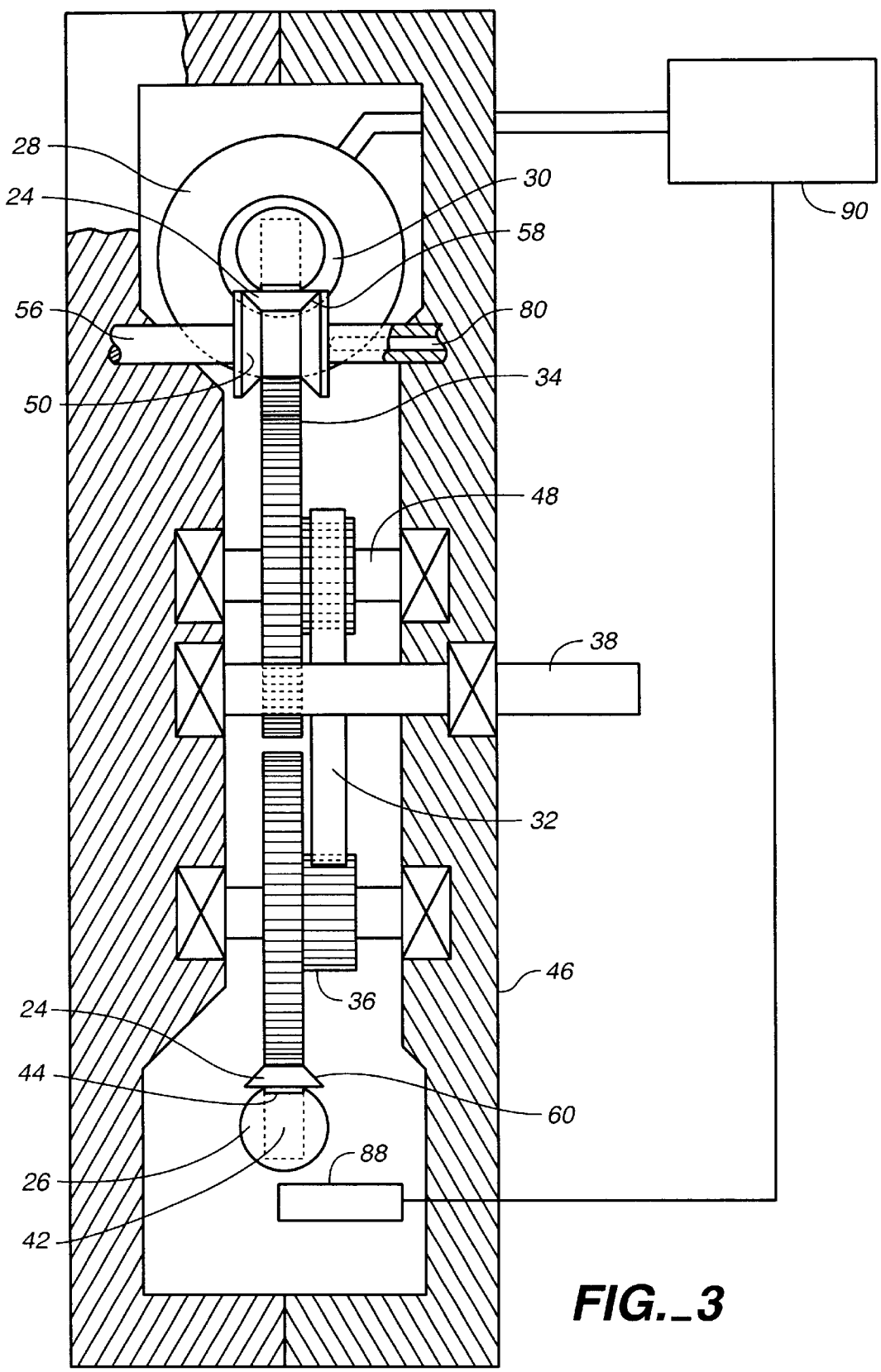
FIG._3

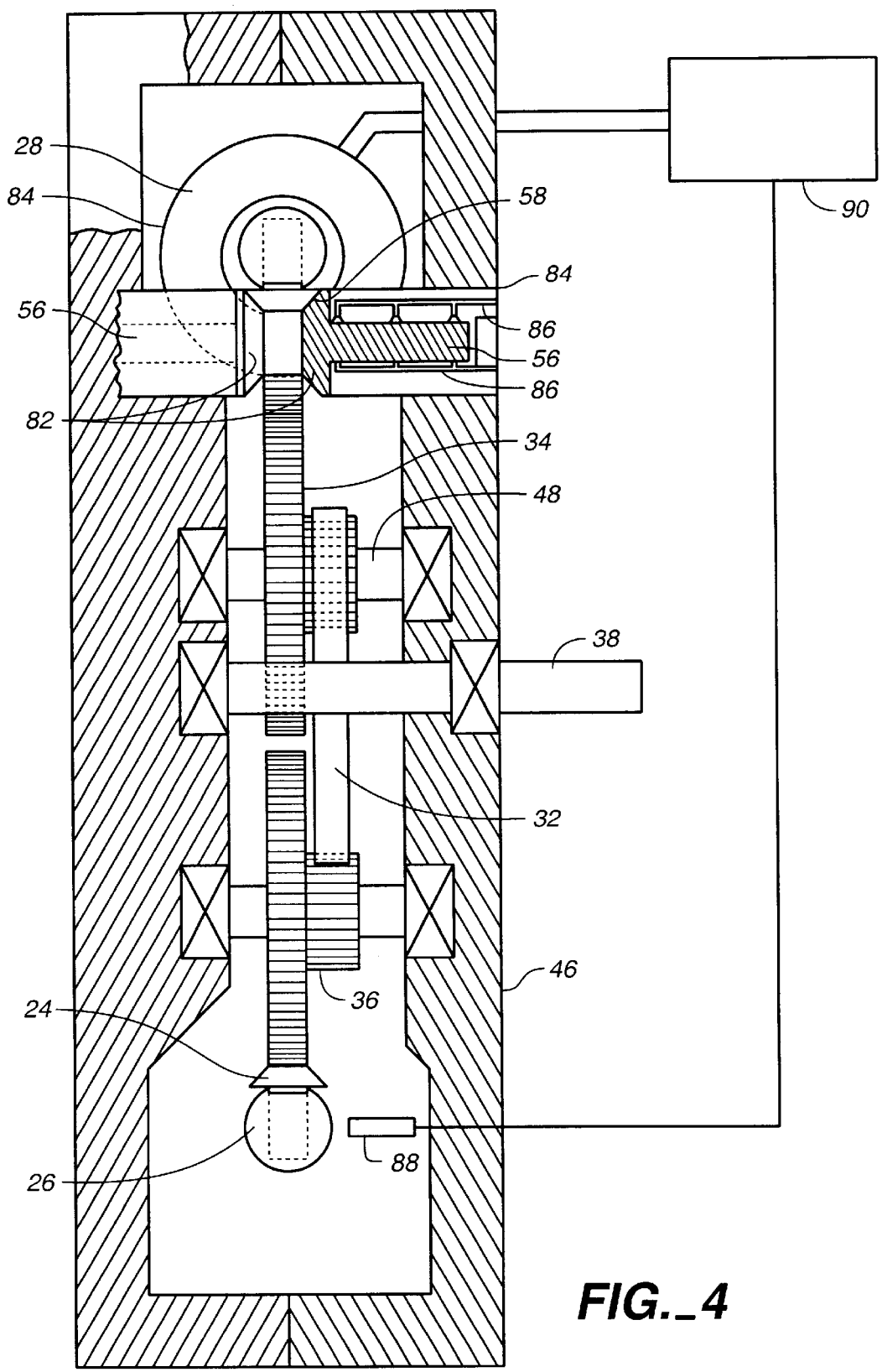
FIG._4

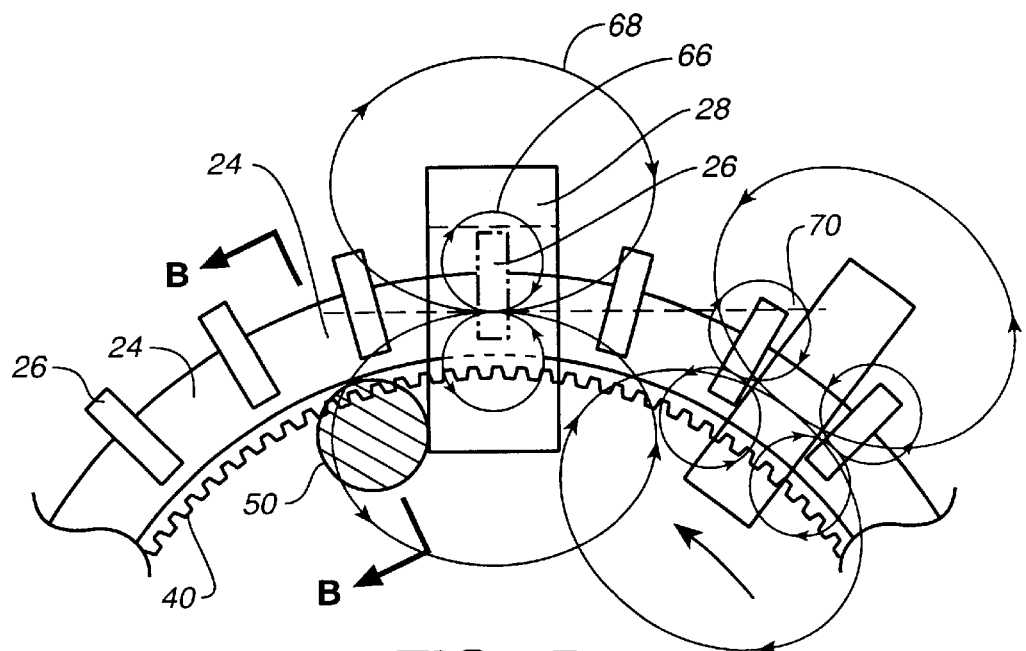
FIG._5
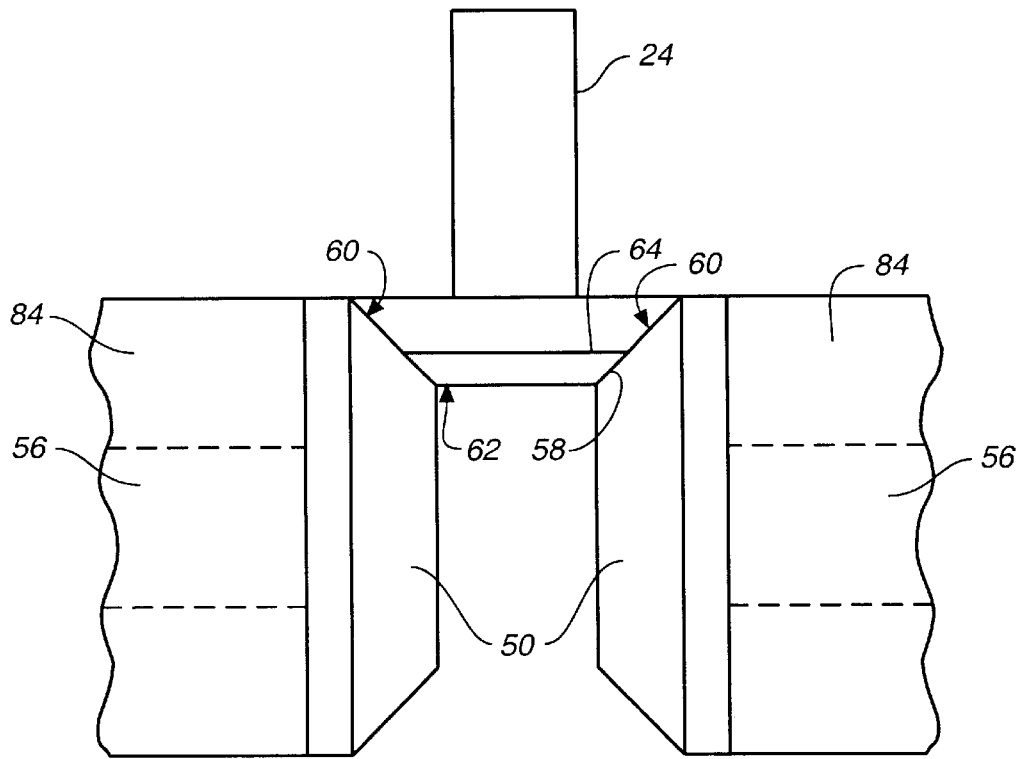
FIG._6

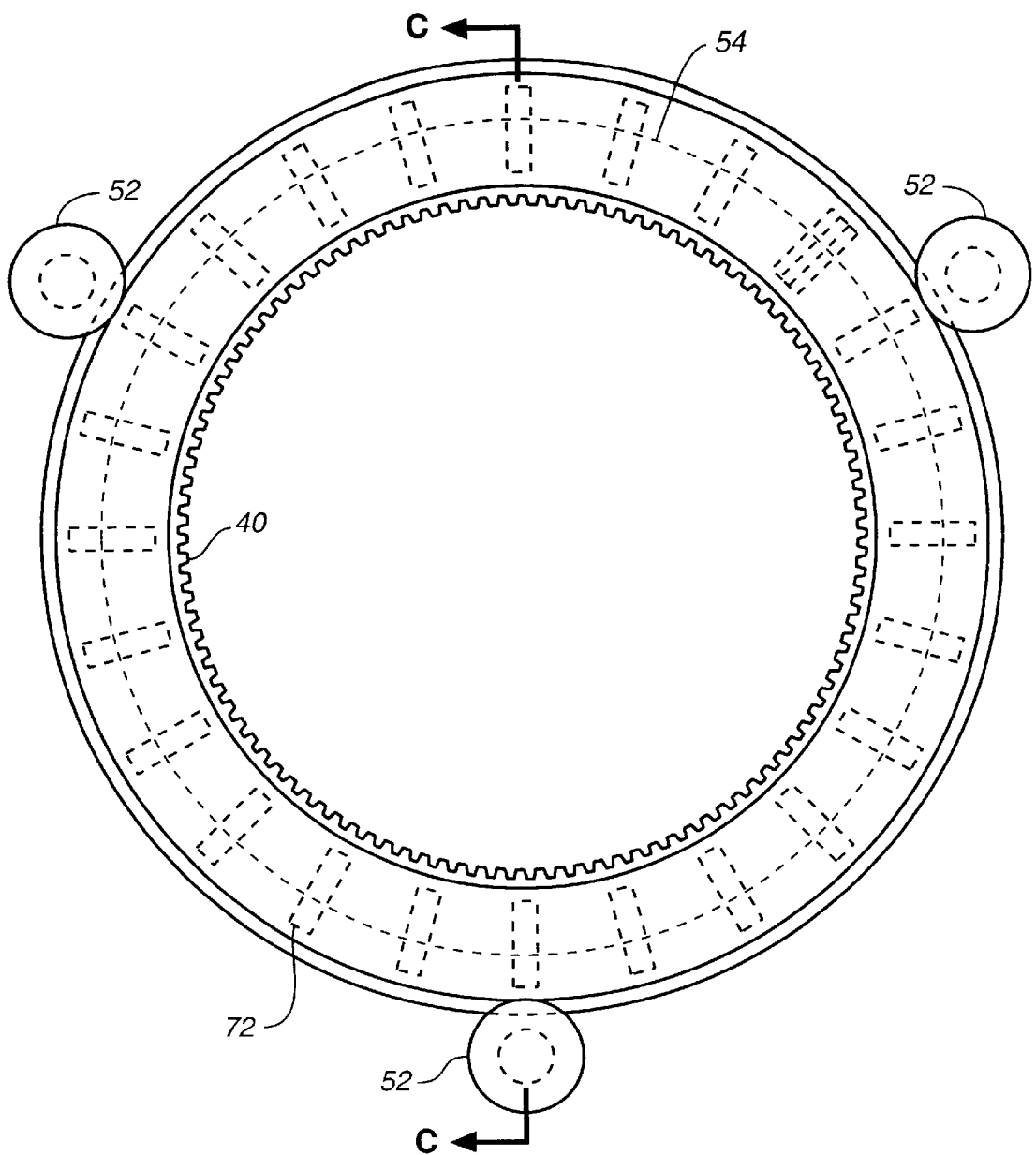
FIG._7

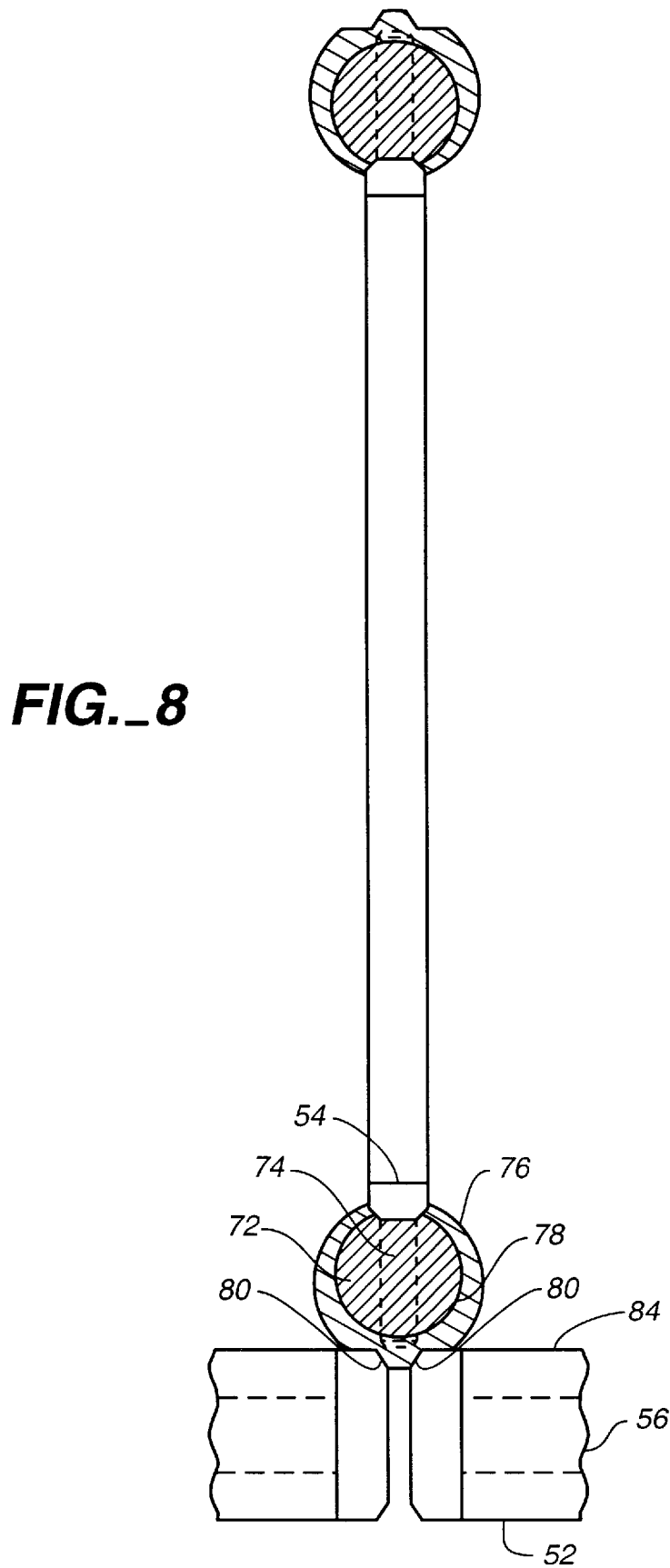
FIG._8

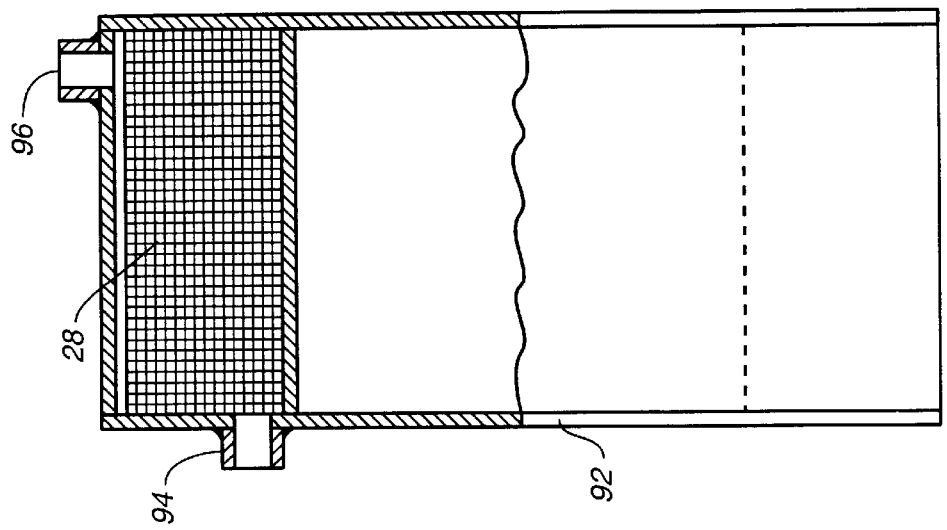
FIG._10
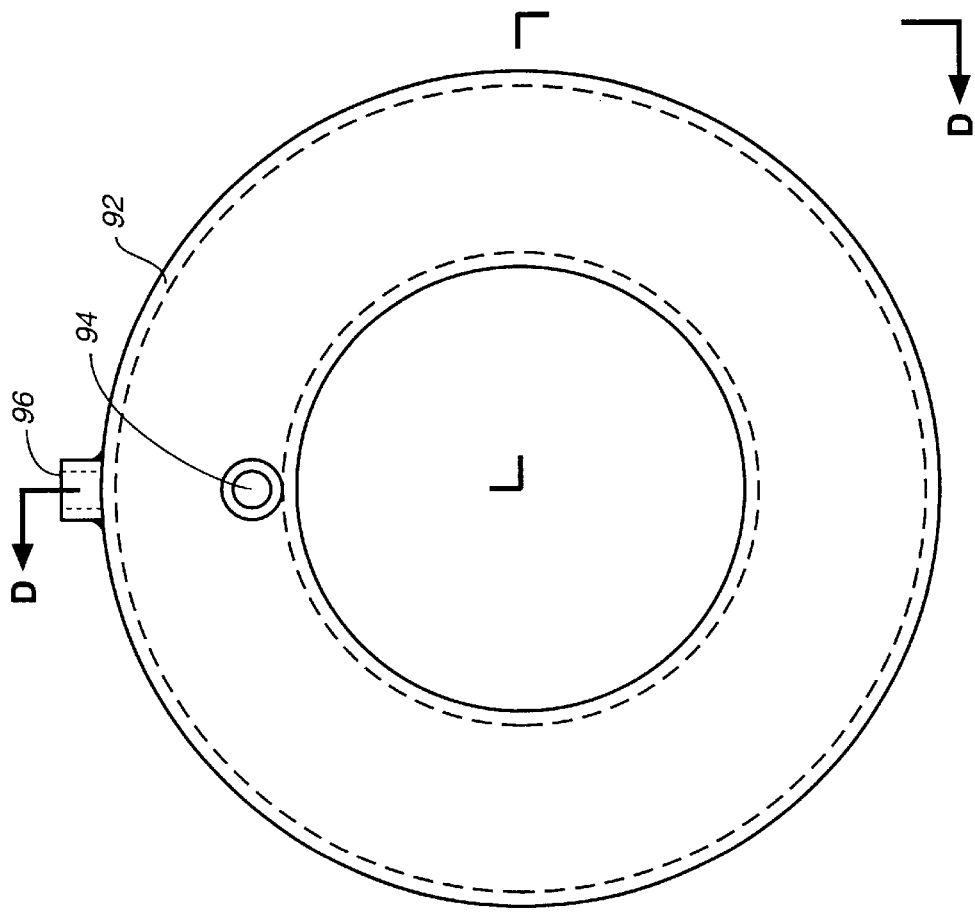
FIG._9

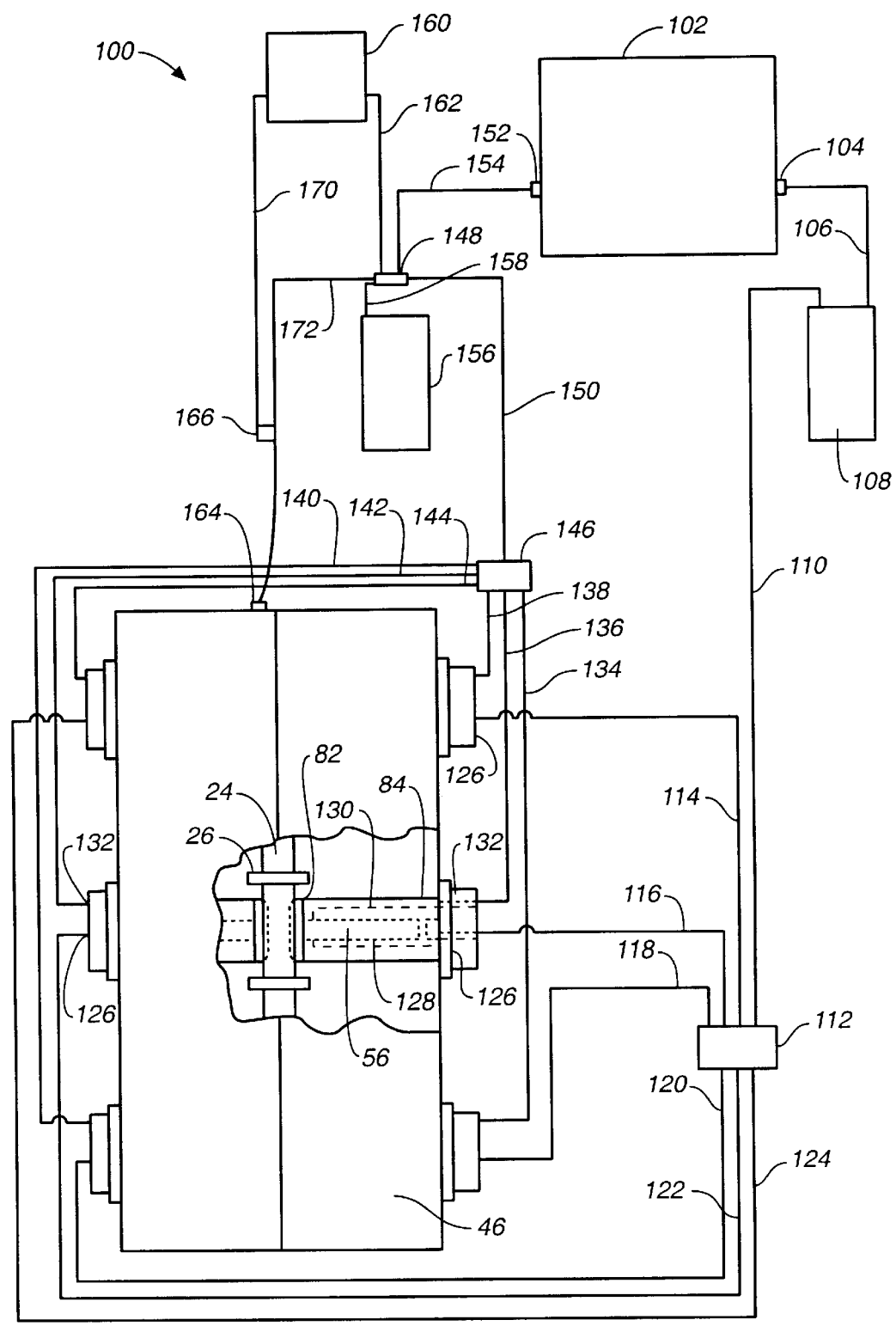
FIG._11

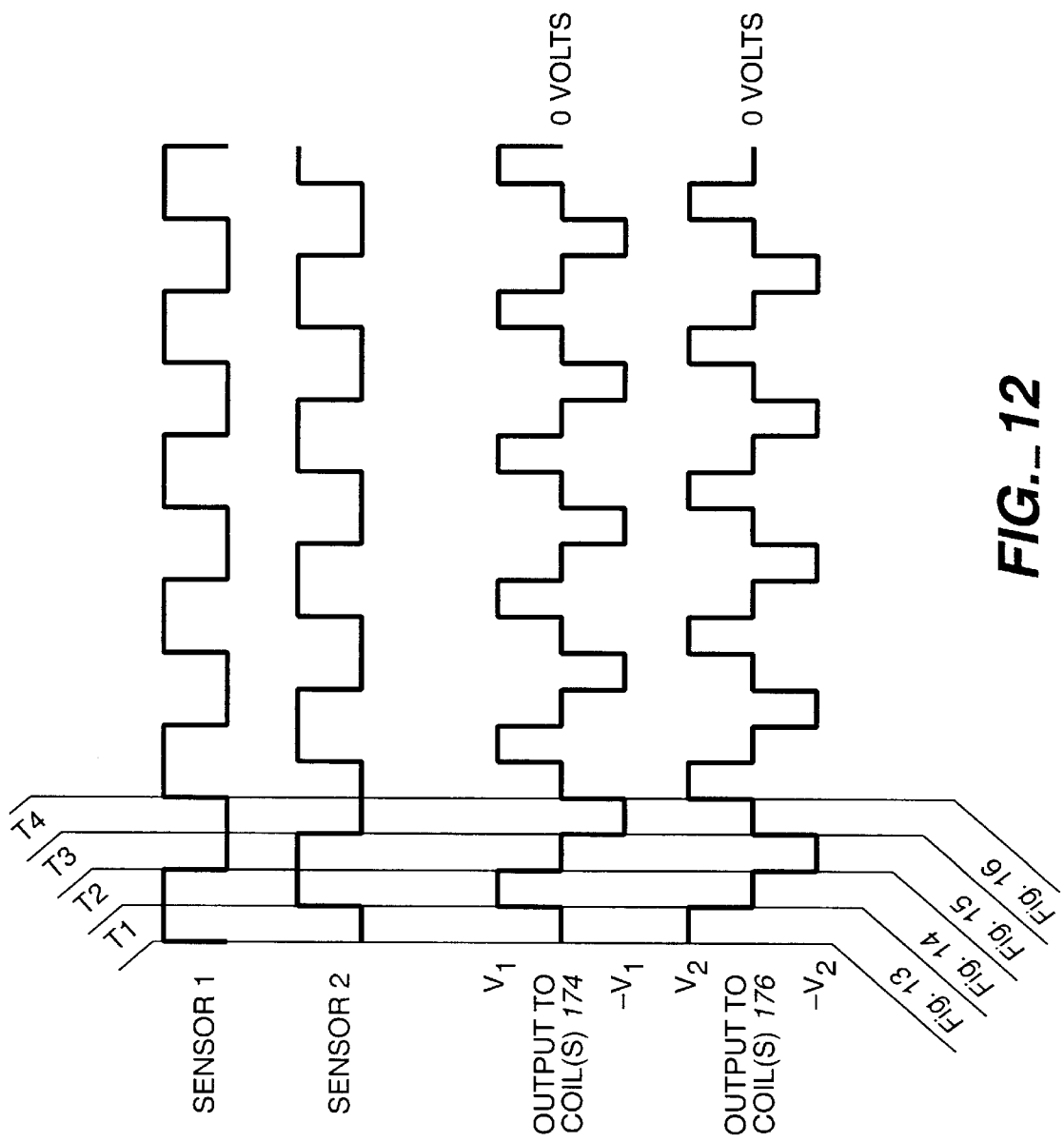

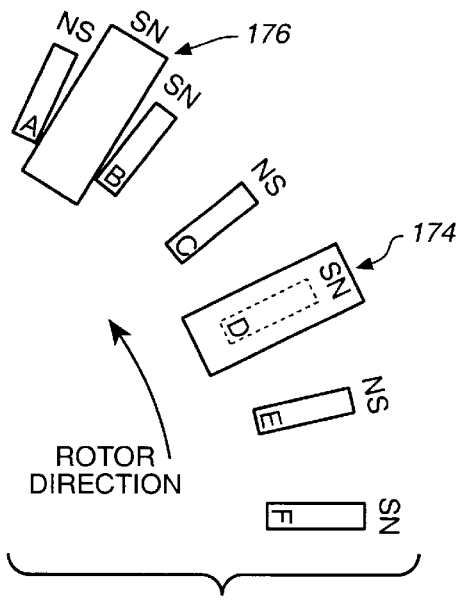
FIG._13
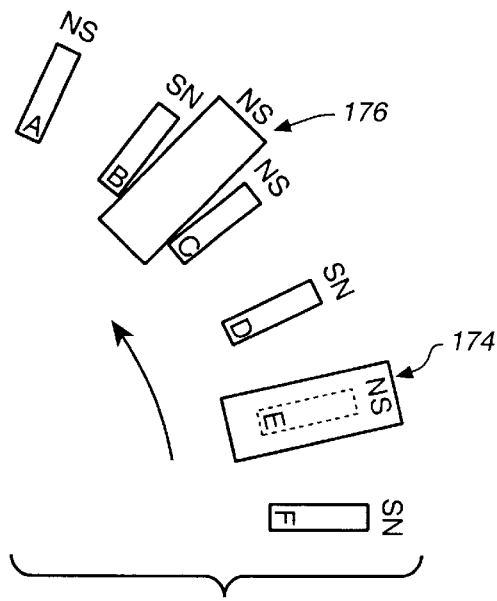
FIG._15
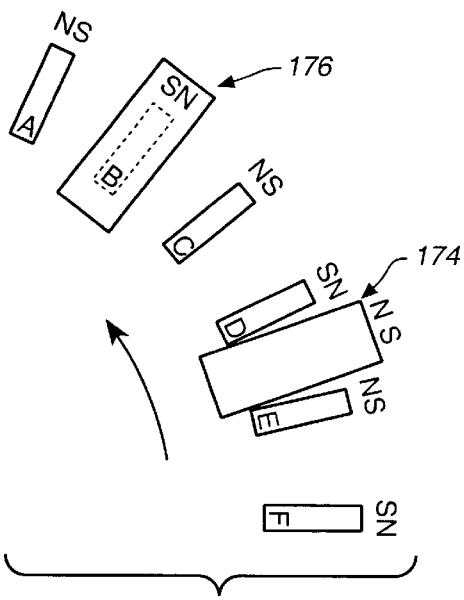
FIG._14
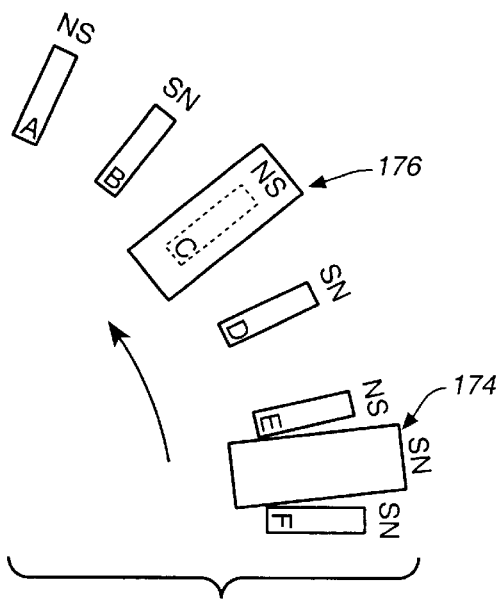
FIG._16

ELECTRIC MOTOR WITH RING ROTOR PASSING THROUGH COILS

RELATED APPLICATION

This application is a continuation-in-part ("CIP") of U.S. application Ser. No. 09/034,871, filed on Mar. 4, 1998, now abandoned, the disclosure of which is incorporated by reference herein.

BACKGROUND OF THE INVENTION

1. Field of Invention

The present invention relates to electric motors, and more specifically to a motor with a rotor assembly, having a rotor upon which permanent magnets are affixed, passing through the center of stator coils.

2. Description of Related Art

Electric motors are at the heart of many machines used in both homes and factories. Electric motors are quiet, non-polluting energy sources used in a wide variety of applications, from operating toothbrushes to golf carts, and to propelling automobiles.

Turning to FIG. 1(a), a general model of an electric motor is shown, where an electric motor 10 receives an electric current 12 as an input to be applied to wound coils therein for generating a magnetic field. With the model for the electric motor of FIG. 1(a), the electromagnetic fields induced in the coils are converted into output torque 14. Although not shown, this is usually accomplished with a rotor acting on an output shaft 16. Stated simply, FIG. 1(a) shows electricity as an input and torque as an output. It would be desirable if the output torque of the motor could be increased without necessarily having to increase the input electrical energy.

Motor 10 may run in reverse as in FIG. 1(b) to function as a generator. In this case, torque 18 is applied to shaft 16 and is thereby converted by the motor into output electric current 20. Stated simply, torque is input to the motor, and electricity is output. In either case, it is desirable to convert energy as efficiently as possible.

In order to improve and to obtain high efficiency within an electric motor, the present inventors noticed a need to eliminate or overcome sources of inefficiencies.

SUMMARY OF THE INVENTION

The electric motor of the present invention includes a rotor assembly, having a rotor with associated magnets affixed thereto, passing through stator coils. In an exemplary embodiment, the electric motor comprises a structure having: a housing; the rotor assembly supported therewithin, and having a ring rotor with a plurality of magnets permanently attached thereto; and a plurality of stator coils that are supported within the housing and through which the rotor assembly completely passes when the rotor moves in a direction of rotation. The structure includes an inventive arrangement where the adjacent magnets are alternated between having respective North poles facing toward or against the direction of rotation.

According to the present invention, the stator coils are arranged in groups about the periphery of the rotor, and the application of electrical energy to each coil in a group is performed so that each coil simultaneously attracts a magnet and repels an adjacent magnet. Moreover within each group, the coils are never simultaneously energized (e.g., turned on to certain voltage level or its inverse) or de-energized (e.g., turned off to zero volts).

In an exemplary embodiment, pairs of coils are disposed about the periphery of the rotor and the electrical energy applied to one of the coils in each group is out of phase with respect to the electrical energy applied to the other coil in the group. As a first magnet passes through the center of the first coil, the first coil is de-energized. After the first magnet moves away from the first coil and when the first coil is evenly spaced between the first magnet and a second magnet of opposite polarity, the first coil is energized with a voltage level of opposite polarity so as to repel the first magnet away from the first coil and simultaneously attract the second magnet towards the first coil. This process reoccurs with the second coil, which is out of phase so as to accommodate the circumferential distance that the magnets must travel past the first coil to reach the second coil. Collectively, the energization, de-energization and energization with alternating polarity of each coil causes the rotor to continuously move in the direction of rotation with improved efficiency.

In accordance with one embodiment of the present invention, a Hall effect sensor is used to detect the position of the permanent magnets with respect to the center of the stator coils, and a motor controller is used to correspondingly control the electrical energy provided to the coils. The sensor is used to detect the position of the rotor. This information may be used by the controller to determine the angular velocity of the rotor and to control the timing of energizing the electromagnets to achieve a desired acceleration or angular velocity of the rotor.

The electric motor of the present invention may also include planetary gears meshed with a sun gear that is connected to an output shaft for providing output torque transmission. Other gears may also be coupled between the planetary gears and the sun gear for driving or powering the rotation of the output shaft. Collectively, this mechanical structure translates the rotational movement of the rotor to output motor torque.

In another aspect of the present invention, motor inefficiency found in conventional motors is improved with the use of efficient support bearings. In a preferred embodiment, the support bearings are air bearings used to reduce friction occurring around the rotor.

In yet another aspect, the present invention uses a sealed environment in which the electric motor is confined in order to avoid particulate contamination.

In one embodiment of the present invention, the air bearings may be enclosed so that air may be provided thereto and exhausted therefrom. In another embodiment, the present invention provides a "closed system", where the interior of the motor housing is sealed from atmosphere and drawn down to near vacuum conditions. Furthermore, the same vacuum system may be used to evacuate the housing and to exhaust the air bearings. Use of a vacuum system improves motor efficiency by reducing turbulent airflow and air resistance around the rotor.

In a further aspect, the present invention includes a system for supplying air or other gas to the bearings, and for exhausting the bearings and the housing.

It is believed that motor efficiency may be improved if the stator coils of the present invention are formed from superconductive materials. It is further anticipated that if the stator coils are cooled below a critical temperature, then energy losses due to coil resistance may be reduced, and a desired degree of rotor levitation may be achieved ideally sustaining high rotational speeds with low energy dissipation. In an exemplary embodiment, the present invention includes an inventive structure for enclosing the stator coils so that a cooling agent may be used to cool the coils to operate with superconducting effects.

It is yet a further object of the present invention to provide an electric motor that is scalable and versatile so that it may be applied to a wide range of applications requiring diverse output power specifications. As already mentioned, the electric motor may increase its output torque to lend itself to applications requiring larger output torque. Additionally, a plurality of electric motors of the present invention may be coupled together (e.g., grouped together in a cell configuration, connected in series or in a chain) to operate as a system so that more power may be delivered to a final system output.

In another aspect of the present invention, conventional steel or iron cores are not used so as to reduce mutual inductance occurring within the stator windings. Instead, the present invention uses a ring rotor in an exemplary embodiment to which stator coils are disposed apart from each other so as to avoid mutual inductance from occurring therebetween. With the present invention, motor inefficiency is also improved by replacing conventional materials used for the housing, rotor, gears and supports with materials that have a minimal impact on the magnetic fields. These materials are generally non-conductive and non-magnetic in nature.

It is yet a further object of the present invention to provide an electric motor that may be operated in reverse to function as a generator. In particular, input torque is applied to the electric motor to thereby cause magnetic fields from the permanent magnets to induce electrical current in the stator coils which may collectively provide output electricity. Operated in this manner, the present invention is able to efficiently generate electricity.

These and other objects of the present invention will become apparent to those skilled in the art from the following detailed description of the invention and preferred embodiments, the accompanying drawings, and the appended claims.

BRIEF DESCRIPTION OF THE DRAWINGS

FIG. 1(a) shows prior art in the form of a block diagram for the functional operation of an electric motor, and FIG. 1(b) shows prior art in the form of a block diagram of the same motor functioning in reverse so as to operate as a generator.

FIG. 2 shows a head-on or front view of an exemplary embodiment of the electric motor of the present invention without the housing.

FIG. 3 shows a sectioned side view of the electric motor with a cut-away housing rotated 30 degrees clockwise and taken along line A—A of FIG. 2.

FIG. 4. shows another embodiment of the air bearing shaft for the electric motor of FIG. 3.

FIG. 5 shows a front cutaway view of the ring rotor of FIG. 2 with a schematic illustration of the interaction of electro-magnetic fields and magnetic fields sharing a common center line.

FIG. 6 shows a cross-sectional cutaway view of the bearing surface and the rotor modeled as a bearing race taken along line B—B of FIG. 5.

FIG. 7 shows a front view of another embodiment for the placement of the support bearings disposed along the outer circumference of the ring rotor of the present invention.

FIG. 8 shows a cross-sectional cutaway view of the chamfered portions of the rotor and support bearing taken along line C—C of FIG. 7.

FIG. 9 shows an enclosure for the purpose of cooling the coils of the present invention.

FIG. 10 shows a partial cross-sectional and partial side view of the enclosure taken along line D—D of FIG. 9.

FIG. 11 shows a system for exhausting the housing and air bearings of the electric motor of the present invention.

FIG. 12 shows a timing diagram of the sensor switching properties as related to energization and de-energization of the coils for the embodiment of FIG. 2.

FIG. 13 shows a particular magnet passing through the center of a stator coil correspond to the timing diagram of FIG. 12.

FIG. 14 shows the stator coil in FIG. 13 evenly spaced between the particular magnet and an adjacent magnet.

FIG. 15 shows the adjacent magnet of FIG. 14 having opposite magnetic pole polarity when passing through the center of the stator coil.

FIG. 16 shows the stator coil in FIG. 15 evenly spaced between the adjacent magnet and another adjacent magnet.

DETAILED DESCRIPTION OF THE INVENTION

In the following description, various aspects of the present invention will be described. However, it will be apparent to those skilled in the art that the present invention may be practiced with only some or all aspects described herein. For purposes of explanation, specific numbers, materials and configurations are set forth in order to provide a thorough understanding of the present invention. However, it will be apparent to those skilled in the art that the present invention may be practiced without the specific details. In other instances, well-known features are omitted or simplified in order not to obscure the present invention.

Parts of the description will be presented in terms of operations performed by the motor, using terms such as electrical energy, electricity, energized, de-energized, turned on, turned off, magnetic fields, magnetic energy, overall magnetic field, electromagnetic, magnetomotive, and the like, all consistent with the manner commonly employed by those skilled in the art to convey the substance of their work to others skilled in the art.

Referring now to FIG. 2, an exemplary embodiment of the electric motor 22 is shown having a structure where a rotor assembly includes a ring rotor 24 with a plurality of permanent magnets 26 disposed about the rotor. The rotor assembly passes through groups of stator coils 28 disposed around the periphery of the rotor. In particular, each stator coil includes a bore 30 defined therein and through which the rotor 24 and the magnets 26 pass through. As will be explained in detail subsequently, electrical energy is applied to the stator coils 28 to induce electromagnetic fields, which interact with the magnetic fields of the permanent magnets 26, thereby causing the rotor to rotate. This rotational movement is translated to an output motor torque through a sun gear 32. The electric motor includes torque-transmitting planetary gears 34 coupled to smaller gears 36 which mesh with the teeth of sun gear 32. The sun gear 32 includes a rotating member, typically an output shaft 38, which is centered at a particular location and coincides with an axis (axis of rotation) to which the rotor 24 rotates about. As will be further described subsequently, the rotor includes gear teeth 40 which mesh with the planetary gears 34 so as to translate the rotational movement of the rotor to rotational torque at the output shaft. For clarity, many of the teeth on gears 32, 34 and 36, as well as teeth 40, are not shown.

Still referring to FIG. 2, the ring rotor 24 may be fabricated from nonconductive and nonmagnetizing materials that reduce and thereby minimize stray eddy currents and stray magnetization which have the potential to reduce the efficiency of the motor. Similarly, further minimization of losses occurring within the motor may be accomplished by replacing conventional materials for the housing, gears and supports with these nonconductive and nonmagnetizing materials; these features will be introduced subsequently. The use of these materials will have a minimal impact on the overall magnetic fields generated with the motor. By comparison, conventional motors with steel or iron cores may induce back emf which impairs efficiency. The back emf causes losses by creating intensified fields at certain points and increased mutual inductance between the core and the coils. When mutual inductance occurs, the coils of a motor will not act independently but, instead will act as a transformer.

It will be appreciated by one of ordinary skill in the art, that ring rotor 24 may be embodied in a variety of configurations (e.g., essentially a toroid but with cross-sectional shapes that are round, square, rectangular, triangular, or any other convenient configuration) so that it passes through bore 30 of the stator coils 28. It will further be appreciated that the inventive structure comprising the rotor assembly passing through bore 30 of the stator coils 28 may be implemented in a number of ways. In one embodiment, a multiple-piece ring rotor assembly may be inserted through the coils 28 and assembled according to the arrangement described herein. In an alternative embodiment, a multiple-piece stator bobbin (e.g., a two-piece bobbin) may be assembled around the rotor assembly and then wound with wire to form a coil.

For the embodiment shown in FIG. 2, a predetermined number of permanent magnets 26 (e.g. 24 magnets) are affixed around the outer periphery of ring rotor 24. Each of the 24 magnets are spaced apart by 15 degrees. It is preferred that the magnets be arranged about the rotor in an evenly spaced manner as shown; however, it will be appreciated that other spacing arrangements may be used. It is expected that when the spacing has either complete or periodic uniformity over the circumference of the ring rotor, the simultaneous attraction and repulsion of adjacent magnets will be exerted evenly about the rotor. Additionally, each magnet is mounted on rotor 24 in a position which is equidistant from the axis of rotation. For the embodiment of FIG. 2, each permanent magnet 26 has a truncated disc shape with a substantially rectangular section 42 removed from the end facing in the ring rotor's axial direction as seen in FIG. 3. The removed section 42 allows the permanent magnet to fit over the rectangular periphery 44 of rotor 24 and be permanently mounted thereon. The permanent magnets may be attached to the ring rotor 24 by any suitable means, such as an adhesive. In a preferred embodiment, the mounting process is performed in a vacuum using an adhesive which does not out-gas (e.g., 3M® pressure sensitive solid flexible acrylic). Other methods of attachment may be used, for example, a mechanical press fit or fastener. Preferably, high strength magnets are used (e.g, 1600 Oersted or higher).

As will be evident to one of ordinary skill in the art, the number of permanent magnets used depends upon a variety of factors including, without limitation, the size and circumference of the periphery of the rotor, the diameter of the rotor, the weight of the rotor assembly, the arrangement of stator coils, the size of the stator coils, the avoidance of magnetic induction between adjacent coils, and the amount of angular velocity of the rotor and output torque desired.

It will become evident to one of ordinary skill in the art that the physical and magnetic characteristics of the permanent magnets may be varied to change and to maximize the output motor torque. Additionally, these characteristics may be selected to further accommodate various overall package sizes and housing sizes for the motor. For example, the width of the permanent magnet, its shape, size, magnetic strength (e.g. flux density) and thickness may be varied empirically to maximize the motor torque for a given amount of input electrical energy or to control the field interactions of the magnets and stator coils as will be described in more detail herein. Changes to the size and strength of the magnets directly affects the interaction of the magnetic fields with the induced electro-magnetic fields of the stator coils. For example, larger or stronger magnets will produce more torque for a given rotational rotor speed. Changes to the shape of the magnet also provide a way in which to further optimize these above-identified desired results. For example, square or rectangular magnets are well-suited for large, flat and low profile motor applications. By contrast, round magnets are anticipated to be better suited for compact motor applications. FIG. 7 shows yet another embodiment, where the shape of magnets 72 are round, and where the manner of affixing the magnets to the rotor will accommodate an alternative embodiment for the support bearings. FIG. 7 will be described subsequently in detail.

With the present invention embodied in FIG. 2, each of the magnets 26 are disposed about the periphery of the rotor with alternating polarity, namely North (N.) and South (S.) poles of magnetic polarity and as shown in FIG. 13. Thus, an even number of magnets are used according to the present invention.

Referring to the exemplary embodiment shown in FIG. 2, a total of six stator coils are disposed in three groups of two coils about the rotor. A centerline 39 passes between the two coils of each group and lies radially to the axis of rotation. In this embodiment, the centerlines of the groups are separated by an angle of 120 degrees. Among each pair of coils in a group, the ends 29 of the coils are separated with respect to the axis of rotation by an angle of 37.5 degrees, which is equivalent to the spacing between 2½ magnets. It is preferable that the centerlines of the groups of coils be spaced equidistantly apart so that the attraction and repulsion of the permanent magnets occur evenly about the rotor as described hereinafter. However, it will become apparent to one of ordinary skill in the art that the invention may be practiced to obtain this similar result by using a variety of spacings in between the centerlines. Determination of the spacing between the centerlines is dependent upon a variety of factors, including the size of the rotor circumference, the number of groups of coils used, the amount of output rotational torque desired, and the avoidance of mutual inductance occurring between groups of coils arranged too closely together.

Similarly, the present invention may be further practiced with a number of equivalent embodiments, where for example, different angles of separation between coil ends 29 may be used. Whichever equivalent embodiment is used, it is noted that mutual inductance, which occurs when coils are placed too close to each other, should be avoided because the coils will lose their independent function and operation, and collectively act as a transformer. Moreover, by using more coil groups, more electrical power may be required.

As shown in FIG. 3, the stator coils 28 are disposed within a housing 46 and completely encircle the periphery of the ring rotor 24 with a central clearance for the permanent magnets 26 to pass therethrough. The size of bore 30 is preferably kept as small as practicable in order to improve magnetic coupling. However, bore 30 is of sufficient size to permit the rotor and magnets to pass therethrough unimpeded. It may be necessary to account for manufacturing tolerances and thermal effects when producing stator coils having a minimum clearance to allow the rotor and magnets to pass through the bore. Housing 46 also completely encloses the electric motor 22, and will be further described below.

In an exemplary embodiment, housing 46 seals the motor 22 from the outside environment except for a port which allows a vacuum to be drawn within the housing. The use of a vacuum reduces the amount of air resistance or air friction occurring around the rotor as it rotates. These factors all contribute to improving motor efficiency. The manner of providing a vacuum to exhaust housing 46 will be discussed in further detail subsequently with respect to FIG. 11.

Referring to FIGS. 2 and 3, an embodiment of the structure providing the transfer of rotor movement into output motor torque will be described. Gear teeth 40 are formed along the entire circumference of the inner periphery of ring rotor 24. The teeth may be cut or machined into the rotor. These teeth mesh with gear teeth of the planetary gears 34. The planetary gears 34 are preferably arranged in an evenly-spaced manner about the axis of rotation coinciding with shaft 38; and as seen in FIG. 3, the planetary gears 34 are supported by shafts 48 whose ends are, in turn, supported by bearings located in the motor housing 46. Also supported on shaft 48 is the smaller gear 36 which is coupled to and rotates with the planetary gears 34. The smaller gear 36 includes gear teeth which mesh with gear teeth of the sun gear 32. The sun gear 32 is mounted to rotate with output shaft 38 which is in turn supported by bearings located in the motor housing 46. Because the rotor is located a radial distance away from the output shaft coinciding with the axis of rotation, the rotor turns much faster than output shaft 38 as is conventionally known. Gears 36 are interposed between gears 34 and the sun gear in order to transfer the angular velocity of the rotor to the output shaft via the sun gear. These planetary and sun gears operate as is conventionally known.

The ring rotor 24 may be held in position and supported by a number of support bearings in a variety of embodiments. In a preferred embodiment, support bearings are air bearings which reduce friction. As will be described subsequently in more detail, with air bearings the rotor at any appreciable rotational speeds becomes self-supporting. Air bearings of this type are known in the art. However, one of ordinary skill in the art will appreciate that other equivalent types of support bearings and structures are possible, including but not limited to, ball bearings, roller bearings, and needle bearings.

As shown in FIG. 2, air bearings 50 are disposed along the inner periphery of rotor 24 and provide positional alignment when the rotor rotates. In another embodiment shown in FIG. 7, air bearings 52 are disposed along the outer periphery of rotor 54. In each of these embodiments, the air bearing have surfaces that are capable of supporting both the axial and the radial forces that are generated by the ring rotor, without interfering with the rotation of the rotor 24.

Turning to the embodiment of FIGS. 2–3, the three air bearings 50 shown disposed equidistantly around the inner periphery of rotor 24 are each mounted on an air bearing shaft 56 extending through the motor housing 46. These air bearings 50 include chamfered surfaces 58 formed with complementary angles for matching a beveled surface 60 on the ring rotor 24. The chamfered surfaces 58 provide both support for rotation and guides for positional alignment of the rotor, which may be modeled as a bearing race with a guide bevel surface 60, as shown in FIGS. 5–6. FIG. 6 shows a minor diameter 62 of the gear teeth 40 and the root diameter 64 of the gear teeth. FIG. 5 also shows magnetic fields 66 and 68 sharing common centerline 70, all of which will be described subsequently in detail.

Alternatively, in the embodiment of FIG. 7 where the air bearings 52 are disposed equidistantly apart along the exterior periphery of rotor 54, the bearings and rotor can be similarly designed. As shown more clearly in FIG. 8, a preferred embodiment for supporting the rotor with these bearings includes a rotor 54, permanent magnets 72 with substantially rectangular shape affixed to the rotor, and guide portion 76, all connected therewith. Guide portion 76 may be formed from a plastic or composite compound that has been molded onto the rotor 54. Guide portion 76 includes beveled portions 78 which are received in chamfered portions 80 of the bearing. It will be recognized by one of ordinary skill in the art that the beveled portions 78 may be formed by being ground and/or machined. For example, the beveled portions 78 may be machined concentric to the pitch diameter of the gear teeth 40. When operated and constructed in this manner, the rotor functionally includes a bearing race on its outer periphery to thereby engage the air bearings shown in FIGS. 7–8.

There are a number of ways to supply air to an air bearing. Referring to FIG. 3, a channel 80 runs through the center of shaft 56 to allow compressed air to travel from an air source, to be described subsequently, located outside the housing 46 to the corresponding air bearing 50. Although not shown, air bearings 50 contain orifices or slits, as is conventionally known, which permit airflow through channel 80 to chamfer portions 58 so that a flow of air is provided between portions 58 and the beveled surface 60.

In an alternative embodiment shown in FIG. 4, the air bearings are enclosed so that air from the bearings will be exhausted without disturbing the vacuum within the housing. Air bearings 82 are exhausted within housing 46 by a shaft 56 disposed within an enclosure 84. As will be described in detail subsequently, the shaft includes a channel which runs therethrough allowing air to travel from an air source located outside the housing 46 to the air bearing. As will be described subsequently with respect to FIG. 11, a manifold may be connected to supply lines 86 for supplying and exhausting air to and from the bearings. This permits the air bearing to operate within a closed environment without disturbing the vacuum within the housing. In FIGS. 3–4, the motor also includes at least one sensor 88 and a motor controller 90 which will be described subsequently in detail.

In one embodiment of the present invention, the stator coils may be made from superconducting materials so as to eliminate energy losses due to coil resistance. It is believed that using superconducting materials may also suspend and levitate the rotor. For example, various bismuth-based compounds are being fashioned into superconducting wires and coils. Coils formed from these materials are known as high-temperature superconductors and may. be cooled to low temperatures with an inexpensive and readily available coolant (e.g., liquid nitrogen).

The stator coils made from superconducting materials may be enclosed and isolated from the rest of the motor of the present invention with an inventive structure used for cooling the stator coils in order to maintain them at superconducting temperatures. Turning to FIGS. 9–10, an enclosure 92 is shown whereby each coil 28 is completely sealed about the bobbin and a cooling agent, such as liquid nitrogen, is filled therein to maintain the coil at a superconducting temperature. The cooling agent is pumped into the enclosure through an opening 94 and out of the enclosure via opening 96.

FIG. 11 shows an embodiment for a system 100 according to the present invention for supplying and exhausting air or other gas to and from the air bearings. System 100 may also be used to exhaust the housing. System 100 consists of an air source such as a compressor 102 providing air or other gas via output port 104 and line 106 to a pressure accumulator 108. The pressure accumulator 108 in turn provides gas at a substantially constant pressure level via line 110 to a manifold regulator 112. Several connection supply lines are coupled to manifold 112, including conduits 114, 116, 118, 120, 122, and 124 through which the air is distributed and supplied to a plurality of input ports 126 disposed about the housing. The input ports 126 are in turn connected to input lines 128 disposed within enclosures 84 and which feed the compressed air to the channel in shaft 56 leading to the air bearings 82.

Compressor 102 is preferably of the type which includes a vacuum port 152. Within each of the enclosures 84, a corresponding output line 130 for exhausting the bearings connects the channel of the air bearing 82 to an output port 132 of housing 46. Connection lines, including conduits 134, 136, 138, 140, 142, and 144, are connected from respective output ports 132 to a manifold 146. Manifold 146 is connected to a valve 148 via conduit 150. Valve 148, which may comprise a solenoid valve, is connected to the vacuum port 152 of compressor 102 through conduit 154. Also connected to valve 148 are a vacuum accumulator 156 via conduit 158 and a controller 160 via conduit 162. Housing 46 includes an output port 164. An actuator 166 is disposed between output port 164 and controller 160 and valve 148, and respectively connected therethrough via conduits 168, 170, and 172. Compressor 102 provides suction at vacuum port 152 and through line 154. Vacuum accumulator 156 ensures a substantially constant level of vacuum is maintained throughout the system. Valve 148 controls the switching on or off of the vacuum through the manifold 146 and diaphragm 166. When valve 148 is opened completely, a vacuum is provided to exhaust the air bearings and the housing. When the valve 148 is partially opened, a vacuum is provided to either exhaust the air bearings or the housing 46. Alternatively, a separate vacuum pump may be used to exhaust the housing and the air bearings. Controller 160 detects whether there has been a change in the vacuum level triggered by the valve 148 opening or closing to exhaust the air bearings through manifold 146. In response to these situations, controller 160 will send a signal to actuator 166 to adjust the size of the opening which connects conduits 168 and 172. This ensures that the substantially constant vacuum level (e.g., 7 mTorr) maintained by accumulator 156 is provided to exhaust the housing, air bearings or a combination of both.

When a vacuum is applied to the housing, motor efficiency is improved because air friction within the housing is reduced. Particulate contamination is also reduced by using a sealed housing.

A general description along with exemplary embodiments of the electric motor according to the present invention having been given, attention is now directed to the method of operating the present invention.

With the present invention, the stator coils are energized in a manner that will simultaneously attract and repulse adjacent permanent magnets located about the periphery of the ring rotor. The result of this combined attraction and repulsion causes efficient rotational movement of the ring rotor, which is then transferred into the output motor torque. As will become evident from the following description, the sequence of applying electrical energy to the stator coils to attract and repel adjacent magnets as well as the amount of electrical energy applied to the coils both provide ways to increase rotor angular acceleration.

In the embodiment shown in FIG. 2, the stator coils 28 are disposed about the periphery of the ring rotor 24 in three sets having two coils each for a total of six coils. Each coil in a set is energized with a particular sequence and polarity level described subsequently. At least one sensor is used to determine the rotor position. A controller uses the information from the sensor to determine the angular position and velocity of the rotor and to energize the coils. It will be appreciated by one of ordinary skill in the art that a number of embodiments may be used to effectuate this purpose.

In a preferred embodiment, the sensor comprises a Hall Effect sensor because it is conventionally-known to be a reliable sensor. However, one of ordinary skill in the art will appreciate that other types of positional sensors may be used (e.g., photoelectric sensors). For the embodiment of FIGS. 2–4, two sensors 88 are placed around the rotor 24 and within housing 46 to detect a permanent magnet 26 passing by. The sensors send signals to a motor controller 90. One of ordinary skill in the art will appreciate that more or fewer sensors may be used depending upon several factors (e.g., diameter and circumference of the rotor, desired angular velocity of the rotor, the size and number of the coils, number of magnets affixed to the rotor, and space constraints within the housing). Motor controller 90 is coupled to the sensor and the coils, and controls the timing and level of electrical energy supplied to the coils. Although not shown, motor controller 90 includes a logic circuit therein which may be programmed to execute certain functions. Collectively, motor controller 90 and sensor 88 may be used to determine the angular position of the magnet with respect to the center position of a stator coil. Based upon this information, a logic capability may be provided within the motor controller 90 to calculate the angular velocity of the rotor. Information about the position of a magnet is used by controller 90 to either energize, de-energize or energize with an opposite polarity the stator coils based upon the position of the magnet with respect to the center of the stator coils. This configuration also allows the motor controller 90 to adjust the acceleration of the rotor to a desired level according to the following. For example, the stator coils may be energized by controller 90 to maximize the angular acceleration of the rotor to a predetermined level programmed into the logic circuit or set by a user. The controller 90 can smoothly accelerate rotational movement of the ring rotor 24 up to a predetermined and selectable angular velocity and then monitor and maintain that angular velocity. By controlling the electrical energy applied to the coils, controller 90 may increase, decrease or maintain the angular velocity of the rotor. The overall operation of the motor, stator coils, motor controller and sensors in this embodiment will be better understood by referring to FIGS. 12–16.

FIG. 12 illustrates a timing diagram showing the sequencing of the motor controller 90 applying energy to the stator coils in relation to signals received from the sensors. FIGS. 13–16 are exemplary of all groups of coils, but provide "snap-shots" of the relationship of the adjacent permanent magnets A, B, C, D, E and F with respect to one pair of stator coils 174, 176 for simplicity and brevity when the rotor moves. Also for simplicity, when viewing FIG. 12, voltage levels have the following relationship: $V_1=V_2$ and $-V_1=-V_2$. For this embodiment, a power supply system energizes coil 174 with electrical energy 37.5 degrees out of phase with coil 176.

At time $T_1$ as shown in FIG. 13, sensor 1 and controller 90 have determined that magnet D is passing under the center of coil 174. Motor controller 90 then de-energizes coil 174 (e.g., zero volts; this will also be referred to as being turned off). Simultaneously, sensor 2 and controller 90 have determined that the adjacent coil 176 is evenly spaced between two permanent adjacent magnets A and B. Motor controller 90 then energizes coil 176 to a voltage level $V_2$ that simultaneously repels magnet A away from and attracts magnet B towards coil 176 so as to propel the rotor in the direction of rotation. Coil 176 is thus turned on and has poles S. and N., as shown. The S. pole repels magnet A, and the N. pole attracts magnet B.

At time $T_2$ as shown in FIG. 14, sensor 2 and controller 90 have determined that magnet B is passing under the center of coil 176 and motor controller 90 de-energizes coil 176. Simultaneously, the adjacent coil 174 is evenly spaced between two adjacent permanent magnets D and E. Motor controller 90 then energizes coil 174 to a voltage level $V_1$ that simultaneously repels magnet D away from and attracts magnet E towards coil 174 to keep the rotor moving in the direction of rotation. Coil 174 is considered to be turned on and has poles N. and S., as shown. The N. pole repels magnet D and the S. pole attracts magnet E.

At time $T_3$ as shown in FIG. 15, magnet E is passing under the center of coil 174 and motor controller 90 de-energizes coil 174. Simultaneously, the adjacent coil 176 is evenly spaced between two permanent adjacent magnets B and C. Motor controller 90 then energizes coil 176 to a voltage level $-V_2$, that has a polarity which is the inverse of $V_2$. Accordingly, magnet B is repelled away from and magnet C is attracted towards coil 176, thereby propelling the rotor in the direction of rotation. Coil 176 is considered to be turned on but with an inverse polarity as compared with FIG. 13, and has poles N. and S. The N. pole repels magnet B and the S. pole attracts magnet C.

At time $T_4$ as shown in FIG. 16, magnet C is passing under the center of coil 176, and motor controller 90 de-energizes coil 176. Simultaneously, the adjacent coil 174 is evenly spaced between two adjacent permanent magnets E and F. Motor controller 90 then energizes coil 174 to a voltage level $-V_1$, that has a polarity which is the inverse of $V_1$. Accordingly, magnet E is repelled away from and magnet F is attracted towards coil 174, thereby propelling the rotor in the direction of rotation.

Thus according to the present invention, when a coil is energized, the adjacent magnets on the rotor are simultaneously attracted to and repulsed away from the coil. It can be seen that this results because of the arrangement wherein adjacent magnets have alternating polarity. As will be described henceforth in FIGS. 13–16, according to a preferred embodiment of the present invention, when a permanent magnet passes directly through the center of one of the coils of a pair of coils, the other coils in the pair will be evenly spaced between two adjacent magnets.

Specifically as seen in FIGS. 13–16, when magnets of alternating polarity approach a coil, the coil is energized with voltages of alternating polarity to attract an approaching magnet and repel an adjacent magnet moving away from the center of the coil. For example, in FIG. 13, when coil 176 is energized to level $V_2$ at time $T_1$, it has the effect of simultaneously attracting the south pole S. of magnet B, and repelling the south pole S. of magnet A. By comparison, coil 176 in FIGS. 13 and 15 attract and repel adjacent magnets in a similar but not identical fashion. In particular, coil 176 is energized to a voltage level of certain polarity that causes the pulling and pushing away of adjacent magnets as described. Moreover, it is also noted that the voltage level applied to one coil in the pair is of opposite phase with respect to the voltage level applied to the other coil.

The present invention permits the acceleration of the rotor to be controlled by adjusting a number of factors. For example, by increasing the amount of the electrical energy delivered to the coils, the strength of the electromagnetic fields induced in the coils may be increased. The coupling of these fields with the fields from the permanent magnets directly affects the angular velocity of the rotor that results from the simultaneous attraction and repulsion of adjacent magnets by the stator coils. An increase in the angular velocity corresponds to an increase in the angular acceleration of the rotor. In another example, the geometry and placements of the stator coils and magnets allow fields from the electromagnets to also be increased. This increase field strength corresponds to an increase of the acceleration of the rotor. Still furthermore, by selecting suitable magnets with higher coercivity (e.g., 1600 Oersted) and higher saturation magnetization, the magnetic field strength of the permanent magnets may be increased. When these magnetic fields are combined with the electromagnetic fields, the angular acceleration of the rotor is also increased.

Having described the particular embodiment for the sensor and power supply system as shown in FIG. 2, it will become apparent to one of ordinary skill in the art that equivalent substitute embodiments may be used to achieve similar results. For example, a hole drilled through the rotor and used with at least one optic light beam sensor may equivalently be used to detect the position of the rotor. When used with a power supply system equipped to perform logic calculations, the angular velocity of the rotor may be determined so as to control how the coils are energized. Whichever embodiment for sensing rotor angular velocity and for supplying power to the coils is used, when a coil is evenly spaced between adjacent magnets, a proper polarity and phase of energy must be supplied to the coil to simultaneously cause a magnet approaching the coil to be attracted thereto and to cause an adjacent magnet moving past the coil to be repelled away therefrom.

The motor of the present invention can further provide increased output torque by coupling together individual motors (e.g., in a group or cell configuration, in a chain or in series). For example and although not shown, a plurality of motors of the present invention may be stacked side-by-side, each with an output shaft spaced alternately to one another and coupled or mechanically linked to a common output shaft to thereby provide an overall increased output torque. This versatility and scalability lends the present invention not only to smaller applications with few motors connected in series, but to larger applications requiring considerably more motors coupled together in series so as to provide a final increased output torque. In other embodiments, when the motors are grouped together in a cell configuration, they may share a common drive shaft or a common shaft centerline. Furthermore, it will become apparent to those skilled in the art that the motors may be grouped together through other drive configurations permitting the motors to operate together as a system so that more power may be delivered to a final system output.

The present invention can also be operated in reverse as a generator to generate electrical energy from a mechanical torque placed upon output shaft 38. With the embodiment of FIGS. 2–4, input torque may be applied to shaft 38 to thereby turn the sun gear 32, which in turn drives the smaller gears 36 and planetary gears 34. Because gear teeth 40 is meshed with the gear teeth of planetary gears 34, the rotor will rotate. This motion causes the rotor assembly, including the permanent magnets, to pass through the center of the stator coils. Because of the coupling of fields described herein, electrical energy is induced in the stator coils. More specifically, the torque applied to the output shaft causes magnetic fields within the motor to react on the wound coils therein and to induce output electric current. This electrical energy will flow to the motor controller 90 and may be tapped therefrom. Operated in this manner, the present invention is able to generate electrical energy with minimal losses from the transfer of input torque because the induced electricity is maximal when the magnetic fields of the permanent magnets interact with the electromagnetic fields of the stator coils as previously described.

Although particular embodiments of the invention have been described in detail herein along with the corresponding method of operation with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An electric motor, comprising:
   a ring rotor rotatable about an axis and having a periphery including a structure defining a plurality of teeth;
   a plurality of magnets supported by said ring rotor and spaced from the plurality of teeth;
   a plurality of toroidal coils circumferentially disposed about the ring rotor, wherein each of said toroidal coils includes a coil structure defining a bore, said ring rotor and said magnets passing through said bore when said ring rotor rotates;
   a housing;
   at least one sensor for determining the position of said ring rotor; and
   a power supply system in communication with said sensor and electrically coupled to said toroidal coils for energizing each of the toroidal coils.

2. The electric motor as defined in claim 1, wherein said magnets are permanent magnets.

3. The electric motor as defined in claim 1, wherein said plurality of magnets are evenly spaced apart.

4. The electric motor as defined in claim 3, wherein said plurality of magnets comprise 24 permanent magnets.

5. The electric motor as defined in claim 1, wherein said magnets have a truncated disc shape with a substantially rectangular section removed to permit said magnets to fit over the ring rotor.

6. The electric motor as defined in claim 1, wherein said toroidal coils are bobbin wound stator coils.

7. The electric motor as defined in claim 1, wherein said toroidal coils are disposed about the ring rotor in a plurality of groups.

8. The electric motor as defined in claim 7, wherein each said group comprises an equal number of said toroidal coils spaced apart.

9. The electric motor as defined in claim 7, wherein there are three groups.

10. The electric motor as defined claim 7, wherein adjacent toroidal coils in each group are energized with voltage of opposite phase.

11. The electric motor as defined in claim 10, wherein each of said groups comprises a pair of said toroidal coils, and wherein said power supply system energizes one toroidal coil of said pair 37.5 degrees out of phase with the other toroidal coil of said pair.

12. The electric motor as defined in claim 11, wherein said toroidal coils are sequentially energized with electrical energy of alternating polarity.

13. The electric motor as defined in claim 12, wherein each of said toroidal coils is de-energized when a magnet passes therethrough.

14. The electric motor as defined in claim 1, further comprising a plurality of gears comprising planetary gears meshed with a sun gear coupled to rotate with an output shaft, said ring rotor including gear teeth meshed with said planetary gears.

15. The electric motor as defined in claim 14, wherein said ring rotor, said plurality of said gears and said housing are formed from substantially nonmagnetic and nonconductive materials.

16. The electric motor as defined in claim 1, wherein said housing is sealed.

17. The electric motor as defined in claim 16 further comprising, air bearings disposed within said housing and spaced equidistantly apart and from said axis, said air bearings engaging said ring rotor for maintaining axial and radial alignment of the ring rotor with respect to the toroidal coils and the axis when the rotor moves in the direction of rotation.

18. The electric motor as defined in claim 17, wherein each of said air bearings includes a support shaft supported by said housing, said support shaft being positioned parallel to and equidistant from said axis and including a channel defined therethrough for permitting a gas to be delivered to and exhausted from a respective air bearing.

19. The electric motor as defined in claim 18, wherein said ring rotor includes a beveled portion, and said air bearings includes chamfer portions which receive the beveled portion.

20. The electric motor as defined in claim 19 wherein said beveled portion is disposed along an inner periphery of the ring rotor and engages said chamfer portions.

21. The electric motor as defined in claim 19, wherein said beveled portion is disposed along an outer periphery of the ring rotor and engages said chamfer portions.

22. The electric motor as defined in claim 17, wherein said housing is substantially sealed and includes an exhaust port for exhausting the housing.

23. The electric motor as defined in 22, wherein said housing further includes a plurality of input and output ports for supplying and exhausting a gas respectively to and from the air bearings.

24. The electric motor as defined in claim 23, wherein said exhaust port and said output ports are coupled to a vacuum and said input ports are coupled to a source of compressed air.

25. The electric motor as defined in claim 24, wherein said toroidal coils are formed of superconducting materials.

26. The electric motor as defined in claim 25, further comprising enclosures for said super-conducting coils, wherein each enclosure includes an input port and an output port, said input port being used for filling said enclosure with a coolant and said output port being used for draining said enclosure of the coolant.

27. The electric motor as defined in claim 24 further comprising, a system for supplying the compressed air to the support bearings and for exhausting the housing and the air bearings.

28. The electric motor as defined in claim 1, additionally comprising a controller coupled to said coils for controlling the electrical energy applied to said toroidal coils by said power supply system.

29. The electric motor as defined in claim 1, wherein said sensor is a Hall effect sensor.

30. The electric motor as defined in claim 1, wherein said sensor is a photoelectric sensor.

31. The electric rotor of claim 1 wherein said plurality of magnets are circumferentially arranged on the ring rotor in an alternating polarity fashion such that each magnet has an opposite polarity with respect to magnets disposed immediately on opposite sides thereof.

32. The electric motor of claim 1 wherein said ring rotor includes an outer periphery spaced from said periphery which defines an inner periphery having the structure defining the plurality of teeth.

33. The electric motor of claim 32 wherein said inner periphery of said ring rotor additionally includes a bearing-engaging surface.

34. The electric motor of claim 33 additionally comprising a plurality of air bearings engaged to said bearing-engaging surface of said ring rotor.

35. The electric motor of claim 34 wherein each of said air bearings is disposed between a pair of said coils.

36. The electric motor of claim 35 additionally comprising a plurality of planetary gears engaging said plurality of teeth of said ring rotor and a sun gear coupled to said plurality of planetary gears, each of said planetary gears being disposed between a pair of coils.

37. The electric motor of claim 1 wherein said periphery comprises an inner periphery.

38. The electric motor of claim 37 wherein said plurality of magnets are disposed along an outer periphery of said ring rotor.

39. An electric motor, comprising:
a ring rotor adapted for rotational movement about an axis and having a periphery including a structure defining a plurality of teeth;
a plurality of magnets supported by said ring rotor, said magnets being spaced from the plurality of teeth and being arranged adjacently apart with alternating magnetic polarity and being disposed equidistantly from said axis;
a plurality of toroidal coils circumferentially disposed about the ring rotor, wherein each of said toroidal coils includes a coil structure defining a bore, said ring rotor and said magnets passing through said bore when said ring rotor rotates;
a controller and power supply electrically coupled to said toroidal coils for controlling energization of each of said toroidal coils when spaced between adjacent magnets so as to simultaneously attract and repel the adjacent magnets.

40. The electric motor as defined in claim 39, wherein said magnets are permanent magnets, said toroidal coils are bobbin wound stator coils, said ring rotor comprises gear teeth, and said motor further comprises planetary gears meshed both with said gear teeth and with a sun gear, said sun gear being coupled to rotate with an output shaft.

41. The electric motor as defined in claim 39, wherein said controller comprises
at least one detector for generating signals about the position of said rotor,
said controller being in communication with said detector, said system receiving said signals, and in response thereto, energizing, de-energizing or energizing with an inverse polarity said toroidal coils.

42. The electric motor as defined in claim 41, wherein said signals are used to determine the position of the rotor with respect to a center portion of one of said coils.

43. The electric motor as defined in claim 41, wherein said signals are used to determine the angular velocity of the ring rotor.

44. The electric motor as defined in claim 41, wherein said plurality of coils comprise three pairs of toroidal coils, wherein said toroidal coils for each pair is evenly spaced apart from a centerline extending radially from said axis, the centerline for each pair of toroidal coils being space apart by 120 degrees, wherein said power supply system energizes one toroidal coil when 37.5 degrees out of phase with the other coil of the pair of toroidal coils, and de-energizes said one toroidal coil when a magnet passes through a center portion thereof, said pair of toroidal coils never being simultaneously energized or de-energized.

45. The electric motor as defined in claim 44, wherein when one coil of said pair is evenly spaced between the adjacent magnets, another of said magnets passes through a center portion of the other coil of said pair.

46. The electric motor of claim 39 wherein said ring rotor includes an outer periphery spaced from said periphery which defines an inner periphery having the structure defining the plurality of teeth.

47. The electric motor of claim 46 wherein said inner periphery of said ring rotor additionally includes a bearing-engaging surface.

48. The electric motor of claim 47 additionally comprising a plurality of air bearings engaged to said bearing-engaging surface of said ring rotor.

49. The electric motor of claim 48 wherein each of said air bearings is disposed between a pair of said coils.

50. The electric motor of claim 49 additionally comprising a plurality of planetary gears engaging said plurality of teeth of said ring rotor and a sun gear coupled to said plurality of planetary gears, each of said planetary gears being disposed between a pair of coils.

51. The electric motor of claim 39 wherein said periphery comprises an inner periphery.

52. The electric motor of claim 51 wherein said plurality of magnets are disposed along an outer periphery of said ring rotor.

53. A system of electric motors coupled together to produce a final output torque, each of said motors having an output torque that is progressively larger so that the final output torque is a maximal output torque of said system, each of said electric motors, comprising:
a ring rotor adapted for rotational movement about an axis and having a periphery including a structure defining a plurality of teeth;
a plurality of magnets supported by said ring rotor and spaced from the plurality of teeth;
a plurality of toroidal coils circumferentially disposed about the ring rotor, wherein each of said toroidal coils includes a coil structure defining a bore, said ring rotor and said magnets passing through said bore when said ring rotor rotates;
a controller and power supply electrically coupled to said toroidal coils for controlling energization of each of said toroidal coils when spaced between adjacent magnets so as to simultaneously attract and repel the adjacent magnets.

54. The system of claim 53 wherein said ring rotor includes an outer periphery spaced from said periphery which defines an inner periphery having the structure defining the plurality of teeth.

55. The system of claim 54 wherein said inner periphery of said ring rotor additionally includes a bearing-engaging surface.

56. The system of claim 55 additionally comprising a plurality of air bearings engaged to said bearing-engaging surface of said ring rotor.

57. The system of claim 56 wherein each of said air bearings is disposed between a pair of said coils.

58. The system of claim 57 additionally comprising a plurality of planetary gears engaging said plurality of teeth of said ring rotor and a sun gear coupled to said plurality of planetary gears, each of said planetary gears being disposed between a pair of coils.

59. The system of claim 53 wherein said plurality of magnets are circumferentially arranged on the ring rotor in an alternating polarity fashion such that each magnet has an opposite polarity with respect to magnets disposed immediately on opposite sides thereof.

60. The system of claim 59 wherein said ring rotor includes an outer periphery spaced from said periphery which defines an inner periphery having the structure defining the plurality of teeth.

61. The system of claim 60 wherein said inner periphery of said ring rotor additionally includes a bearing-engaging surface.

62. The system of claim 61 additionally comprising a plurality of air bearings engaged to said bearing-engaging surface of said ring rotor.

63. The system of claim 62 wherein each of said air bearings is disposed between a pair of said coils.

64. The system of claim 63 additionally comprising a plurality of planetary gears engaging said plurality of teeth of said ring rotor and a sun gear coupled to said plurality of planetary gears, each of said planetary gears being disposed between a pair of coils.

65. The system of claim 53 wherein said periphery comprises an inner periphery.

66. The system of claim 65 wherein said plurality of magnets are disposed along an outer periphery of said ring rotor.

* * * * *